July 7, 1925.

B. D. STEVENS ET AL 1,545,073

BEARING CAP

Filed March 7, 1923

Witness:
R. Burkhardt.

Inventors:
Burt D. Stevens
Frank E. Rich,
By Wilkinson, Huxley, Byron & Knight
Attys.

Patented July 7, 1925.

1,545,073

UNITED STATES PATENT OFFICE.

BURT D. STEVENS, OF EVANSTON, AND FRANK E. RICH, OF CHICAGO, ILLINOIS, ASSIGNORS TO MIEHLE PRINTING PRESS & MANUFACTURING CO., OF CHICAGO, ILLINOIS, A CORPORATION OF ILLINOIS.

BEARING CAP.

Application filed March 7, 1923. Serial No. 623,329.

*To all whom it may concern:*

Be it known that we, BURT D. STEVENS and FRANK E. RICH, citizens of the United States, residing, respectively, at Evanston, in the county of Cook and State of Illinois, and at Chicago, in the county of Cook and State of Illinois, have jointly invented certain new and useful Improvements in Bearing Caps, of which the following is a specification.

This invention relates to bearings and more particularly to bearing caps.

In printing presses, as in other machines, bearings having removable caps are used. For example, rollers which need thorough cleaning are journaled in bearings having removable caps so that said rollers may be quickly and easily set in place and also quickly and easily removed.

Removable bearing caps, of course, are not new, but it is found that the quick removable bearing cap now in use, in some instances, due to constant motion and vibration, becomes released from its normal functioning position and not only is thrown from such position, but is thrown into other parts of the machine causing damage to the latter.

Accordingly one object of our invention is to provide a removable bearing cap, which not only may be quickly and easily set in place and quickly and easily removed, but also when once set in place cannot accidently be displaced.

Another object is to provide a simple and efficient bearing and bearing cap arrangement adapted to meet the various requirements for successful commercial use.

These and other objects are accomplished by means of the arrangement disclosed on the accompanying sheet of drawing, in which—

Figure 1:
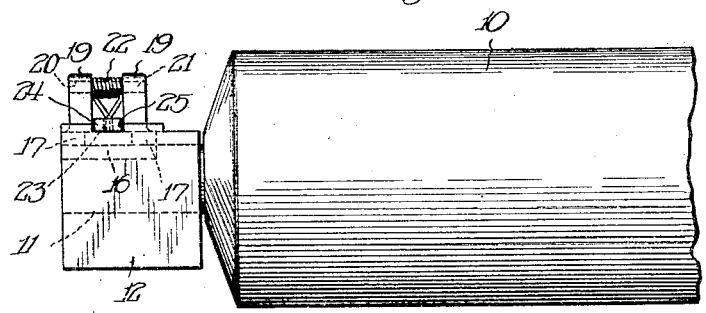
Figure 1 is a fragmentary elevational view of a composition roller used in a printing press and showing our improved removable bearing cap in side elevation and applied to its associated bearing member.

The various novel features of the invention will be apparent from the following description and drawings and will be particularly pointed out in the appended claims.

Referring to the figures of the drawings, it will be seen that we have illustrated our invention in connection with a composition roller 10 used in a printing press, said roller having journals 11, only one of which is shown. Each journal rests in a main bearing member 12 which has upstanding sides 13 with lateral grooves 14 cut therein. Cooperating with this bearing member is a removable bearing cap having a base 15 with a curved bearing surface 16 on its under side and with a plurality of projections 17 extending laterally from said base. These laterally extending projections 17 are received in the lateral grooves 14 of the main bearing member 12. In order to apply the lateral extensions 17 to the lateral grooves 14, the upstanding sides 13 have vertically cut out or recess portions 18 to permit first the downward movement of the lateral extensions 17 preparatory to their registering with the lateral grooves 14, whereupon the removable cap may be moved in an endwise direction as viewed in Figures 1, 2 and 4, in a manner such that the lateral projections 17 are held in grooves 14 against vertical movement.

Extending upwardly from the base 15 of the removable bearing cap are two spaced legs 19 provided with registering openings 20 for the reception of a pin 21 around which a coiled spring 22 is wound, the opposite ends of which terminate in laterally and downwardly extending portions which are held in openings or pockets 23 in opposite ends of a bar 24. This bar is movable with respect to the body portion of the cap but normally held stationary against the upper portion of the base by the tension of the spring 22. The primary function of the bar 24 and spring 22 is to prevent accidental endwise movement of the removable cap as viewed in Figures 1 and 2. When the removable cap is in its normal functioning position, the extended ends of the bar 24 occupy oppositely arranged grooves or pockets 25 in the sides 13 of the bearing member 12. With the bar 24 in the position shown in Figures 1, 2 and 3 of the drawings, it will be appreciated that the removable bearing cap is held against accidental endwise movement by the cooperative action of the bar 24 and the walls of the grooves 25 of the sides 13 of the main bearing member 12, and held against accidental vertical movement by the cooperative action of lateral projections 17 and their complementary lateral grooves 14, the spring 22 yieldably holding the bar 24 in its functioning position.

Figure 2:
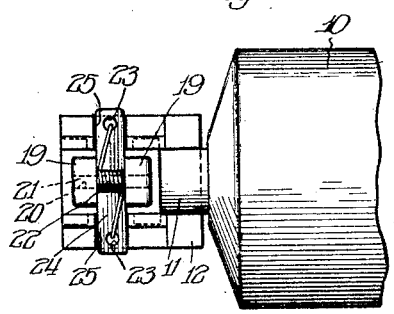
Figure 2 is a fragmentary top plan view of the same arrangement.
Figure 3:
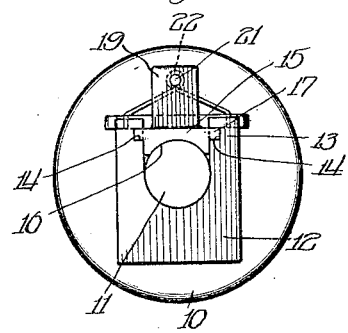
Figure 3 is an end elevation of the same arrangement.
Figure 4:
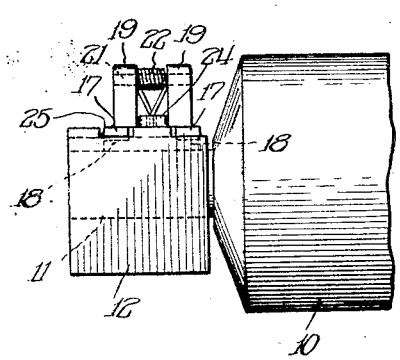
Figure 4 is a view showing the removable bearing cap disconnected from its associated bearing member but in a position to be applied to said main bearing portion, first by a downward vertical movement and then by an outward lateral movement.
Figure 5:
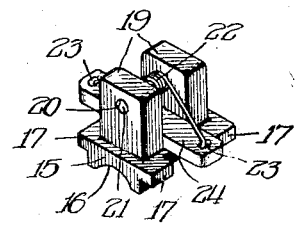
Figure 5 is a perspective view of our improved bearing cap.

In applying the removable cap to its associated bearing member the cap is first placed in the position shown in Figure 4, then it is depressed causing a downward movement of the projections 17 and relative upward movement of the bar 24, the spring 22 being placed under additional tension. When the lateral projections 17 register with the lateral grooves 14 the bearing cap is moved endwise as shown in Figures 1, 2 and 4, until the bar 24 is snapped by the spring 22 into the pockets or grooves 25 in which position the removable cap and its associated bearing member are interlocked against accidental removal or displacement of said cap. To withdraw the cap it is merely necessary to raise the bar 24, against the tension of the spring 22 until the bar is out of the grooves 25, whereupon the removable cap may be moved endwise until the lateral projections 17 move out of the lateral groove 14. The removable cap then assumes the position shown in Figure 4 and is free from its associated bearing member.

It is our intention to cover all modifications of the invention falling within the spirit and scope of the following claims.

We claim:

1. A removable bearing cap including a body portion having projections adapted to cooperate with complementary parts of the main bearing to prevent vertical movement of said cap, and a member on said body portion and movable with respect thereto adapted to cooperate with said main bearing to prevent lateral movement of said cap whereby said cap and its associated bearing member are interlocked against accidental displacement of said cap.

2. A removable bearing cap including a body portion having projections adapted to cooperate with complementary parts of the main bearing to prevent movement of said cap in one direction, and a yieldably mounted member movable on said body portion adapted to cooperate with said main bearing to prevent movement of said cap in another direction whereby said cap and its associated bearing member are interlocked against accidental displacement of said cap.

3. A removable bearing cap including a body portion having means adapted to cooperate with a portion of the main bearing member to prevent movement of said cap in one direction, and yieldably mounted means carried by said body portion adapted to cooperate with the main bearing member to prevent movement of said cap in another direction, whereby said cap and its associated bearing member are interlocked against accidental displacement of said cap.

4. A removable bearing cap including a body portion having means adapted to cooperate with a portion of the main bearing member to prevent movement of said cap in one direction, and spring pressed means carried by said body portion adapted to cooperate with the main bearing member to prevent movement of said cap in another direction, whereby said cap and its associated bearing member are interlocked against accidental displacement of said cap.

5. A removable bearing cap including a main body portion having lateral extensions adapted to cooperate with a portion of the main bearing member to prevent movement of said cap in one direction, said cap having upstanding legs, a pin secured in said legs, a bar between said legs adapted to cooperate with said main bearing member to prevent movement of said cap in another direction, and a spring operatively associated with said pin and bar for yieldably holding said bar in interlocked relationship with said main bearing member for preventing accidental displacement of said cap.

6. In combination, a main bearing member and a removable bearing cap associated therewith, said bearing cap being a self contained unit having a yieldably mounted movable locking member whereby when said bearing cap is applied to said main bearing member it is interlocked therewith to prevent relative movement of said cap and main bearing member.

7. In combination, a main bearing member having a lateral groove therein, and a movable cap having a lateral projection for cooperating with said groove to prevent relative movement of said cap and main bearing member in one direction, said movable cap including a member for cooperating with said main bearing member to prevent relative movement of said cap and main bearing member in another direction, whereby said cap and main bearing member are interlocked against accidental displacement of said cap.

Signed at Chicago, Illinois, this 3rd day of March, 1923.

BURT D. STEVENS.
FRANK E. RICH.